3,786,022
HALOGEN CONTAINING POLYESTERS AND
METHOD FOR PREPARING SAME
Naoaki Hata and Yuzo Takase, Tokyo, Japan, assignors
to Asahi Denka Kogyo K.K., Tokyo, Japan
No Drawing. Filed Mar. 29, 1972, Ser. No. 239,320
Claims priority, application Japan, Mar. 30, 1971,
46/18,950
Int. Cl. C08g 17/08
U.S. Cl. 260—47 C          8 Claims

ABSTRACT OF THE DISCLOSURE

A linear, high molecular weight polyester consisting essentially of recurring structural units having the following formula:

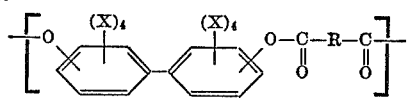

wherein X is a halogen atom; R represents a member selected from the group consisting of divalent aliphatic radicals and divalent aromatic radicals is prepared by reacting (1) one or more compounds represented by the following general formula:

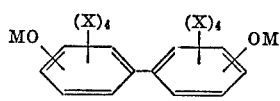

wherein X is a halogen atom; M represents a member selected from the group consisting of hydrogen atom, alkali metal atom and acyl group having 2 to 4 carbon atoms, and (2) one or more compounds represented by the following general formula:

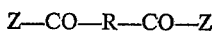

wherein Z represents a member selected from the group consisting of a halogen atom and hydroxyl group; and R has the same significance as defined above.

---

This invention relates to novel polyesters containing halogen atoms, which have excellent flame retardance or non-flammability, thermostability and hydrolysis stability and to a method for their preparation.

Polyesters obtained by condensing bisphenols and dicarboxylic acids are known in the art and have been disclosed in the literature including British Pat. No. 636,429, British Pat. 863,704, Industrial and Chemical Engineering, vol. 51, p. 147 (1959) and Polymer Review, vol. 10 (Condensation Polymer), p. 325 (1965).

However, such known conventional polyesters have several defects such as easy flammability, low glass transition temperature and low hydrolysis stability.

It is an object of this invention to provide novel polyesters containing halogen atoms and having excellent flame retardance, thermostability and hydrolysis stability.

A further object of this invention is to provide a method for preparing such novel polyesters.

A still further object of this invention is to provide novel polyesters containing halogen atoms, useful for making electric appliances and electronic parts.

The polyester of this invention consists essentially of recurring structural units having the following formula:

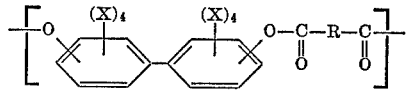

wherein X is a halogen atom, preferably chlorine atom or bromine atom; R represents a member selected from the group consisting of substituted or nonsubstituted divalent cyclic or noncyclic aliphatic compound residues and substituted or nonsubstituted divalent aromatic radicals, preferably divalent aliphatic hydrocarbon radicals and divalent aromatic hydrocarbon radicals.

The method of this invention for preparing the polyesters of this invention comprises essentially reacting (A) an octahalobiphenol or its reactive derivative (I) represented by the following General Formula 1:

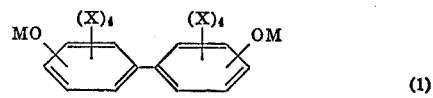

wherein X is a halogen atom such as chlorine atom and bromine atom, preferably chlorine atom; M represents a member selected from the group consisting of hydrogen atom, alkali metal atoms, preferably sodium atom, and acyl groups having 2 to 4 carbon atoms, preferably acetyl group, and (B) a dicarboxylic acid or its reactive derivative (II) represented by the following General Formula 2:

$$Z—CO—R—CO—Z \qquad (2)$$

wherein Z represents a member selected from the group consisting of halogen atom, preferably chlorine atom, and hydroxyl group; R represents a member selected from the group consisting of substituted or nonsubstituted cyclic or noncyclic divalent aliphatic radicals and divalent aromatic radicals.

The polyesters can be prepared by the polycondensation of octahalobiphenol or its derivatives and dicarboxylic acid or its derivatives by the method known in the art for the polycondensation of bisphenols and dicarboxylic acids.

One of the preferable embodiments for preparing the polyesters of this invention is interfacial polycondensation or solution polycondensation of (A) octahalobiphenol or alkali metal octahalobiphenolate and and (B) acid dihalides of dicarboxylic acid and, if desired, (C) other reactants such as other dihydric phenol, dihydric alcohol, polyhydric phenol, polyhydric alcohol, monohydric phenol, monohydric alcohol, polybasic acid halides and monobasic acid halide.

Another preferable embodiment of preparing the polyesters of this invention is melt polycondensation of (A) melted octahalobiphenol diacylate and (B) melted dicarboxylic acid and, if desired, (C) melted other reactants such as other dihydric phenol diacylate, dihydric alcohol diester, polyhydric phenol acylate, polyhydric alcohol ester, monohydric acylate, monohydric alcohol ester, polybasic acid and monobasic acid.

Preferable examples of octahalobiphenol or its reactive derivative (I) represented by the Formula 1 include, for example, octachlorobiphenol, disodium octachlorobiphenolate, dipotassium octachlorobiphenolate, octabromobiphenol, disodium octabromobiphenolate, dipotassium octabromobiphenolate, octachlorobiphenol diacetate, octabromobiphenol diacetate, octabromobiphenol dipropionate and more preferable examples are octachlorobiphenol, octachlorobiphenol diacetate and octachlorobiphenol dipropionate.

One class of the dicarboxylic acid and its reactive derivatives (II) represented by the above General Formula 2 and preferably useful for the preparation of the polyester of this invention are acid dihalides of aromatic dicarboxylic acids (II-1) represented by the following General Formula 2-1:

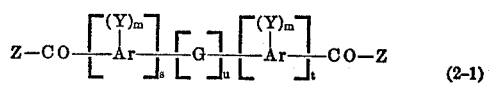

wherein Z is chlorine atom or bromine atom, preferably chlorine atom; Ar represents an aromatic hydrocarbon radical; G is a member selected from the group consisting of divalent groups —D—, —E—, —D—E— and —D—E—D— (wherein D is a divalent aliphatic hydrocarbon radical of up to six carbon atoms, and E is —O—, —S—, —SO₂—, —CO— or —O—CO—O—); Y represents a halogen atom or alkyl group; m ranges from zero to a whole number of replaceable hydrogens substituted on the aromatic hydrocarbon radical; s and t range from zero to one, however s+t range from one to 2; u ranges from zero to one, however when s+t is one u must be zero.

One class of acid dihalides of aromatic dicarboxylic acids (II–1) having the Formula 2–1 are acid dihalides of mononuclear aromatic dicarboxylic acids (II–1–1) of the following General Formula 2–1–1:

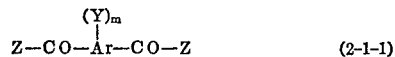
$$Z-CO-Ar-CO-Z \quad (2-1-1)$$

wherein Ar is a member selected from the group consisting of m-phenylene group, p-phenylene group, 1,5-naphthylene group, 2,6-naphthylene group, the groups which are derived by substituting them with halogen atom or (and) alkyl groups; Z is selected from the group consisting of chlorine atom and bromine atom; —CO— is a carbonyl group; Z—CO— is an acid halide group attached directly to an aromatic ring carbon; Y is a substituted halogen atom or a substituted alkyl group; m ranges from zero to 4.

Dicarboxylic acids corresponding to acid dihalides of mononuclear aromatic dicarboxylic acids (II–1–1) are represented by the general formula

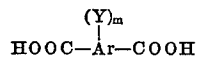
$$HOOC-Ar-COOH$$

and examples of the dicarboxylic acids are terephthalic acid, iso-phthalic acid, 1,4-dicarboxyl-2-chlorobenzene, 1,4-dicarboxyl-2,5-dichlorobenzene, 1,4-dicarboxyl-2,3,5,6-tetrachlorobenzene, 1,5-dicarboxylnaphthalene, 2,6-dicarboxylnaphthalene, 2,7-dicarboxylnaphthalene and the like.

Another class of acid dihalides of aromatic dicarboxylic acids (II–1) having the Formula 2–1 and preferably useful for the preparation of polyesters of this invention are acid dihalides of polynuclear aromatic dicarboxylic acids (II–1–2) of the following General Formula 2–1–2:

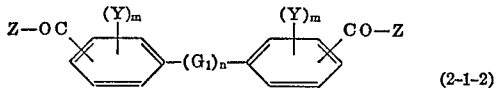
(2-1-2)

wherein G₁ is a member selected from the group consisting of (1) the divalent groups —D— where —D— is a divalent aliphatic hydrocarbon radical of up to six carbon atoms; (2) the divalent groups —D—E— where —D— has the same significance defined heretofore and E is an atom selected from the group consisting of O and S; (3) the divalent groups —E—D—E— where D and E have the same significance defined heretofore; (4) —(O)—; (5) —S—; (6) —SO₂—; (7) —OCOO— and (8) —CO—; Z is a chlorine atom or bromine atom; Y represents a substituted halogen atom; —CO—Z is an acid halide group attached to a substituted or nonsubstituted phenyl group represented by the formula

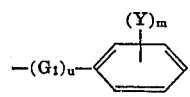

at the ortho-, meta- or para-position, preferably meta- or para-position; m ranges from zero to 4, preferably zero; u ranges from zero to one.

Examples of —G₁— in the General Formula 2–1–2 include —O—, —S—, —SO₂—, alkylene group of —(CH₂)ₙ— wherein n ranges from one to 6, alkylidene group such as ethylidene group and 2,2-propylidene group, aliphatic glycol residue: —O—(CH₂)ₙ—O— where n ranges from 2 to 6, aliphatic thioglycol residue: —S—(CH₂)ₙ—S— where n ranges from 2 to 6, and other glycol residue such as

$$-O-CH_2C(CH_3)_2CH_2-O-$$

Examples of the acid dihalides of polynuclear aromatic dicarboxylic acids (II–1–2) having the Formula 2–1–2 include, but are not limited to, the acid dichlorides and the acid dibromide of the following acids:

4,4'-dicarboxybiphenyl,
3,3'-dicarboxybiphenyl,
1,1-bis((4-carboxyphenyl)methane,
1,1-bis-(4-carboxyphenyl)-ethane,
2,2-bis(4-carboxphenyl)-propane,
1,4-bis(4-carboxyphenyl)-butane,
1,2-bis(4-carboxyphenoxy)-ethane,
1,3-bis(4-carboxyphenoxy)-propane,
1,2-bis(4-carboxy-phenotio)-ethane,
1,4-bis(4-carboxyphenoxy)-butane,
1,5-bis(4-carboxyphenoxy)-pentane,
1,6-bis-(4-carboxyphenoxy)-hexane,
bis(4-carboxyphenyl)-ether,
bis(4-carboxyphenyl)-thioether,
bis(4-carboxyphenyl)-sulfone,
4-carboxyphenoxy-4'-carboxyphenylmethane,
4,4'-dicarboxybenzophenone and the like.

Another class of the dicarboxylic acid and its reactive derivatives (II) represented by the General Formula 2 are acid dihalides of cyclic or noncyclic aliphatic dicarboxylic acids (II–2) represented by the following General Formula 2–2:

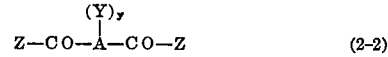
$$Z-CO-A-CO-Z \quad (2-2)$$

wherein Z is chlorine atom or bromine atom; A is an aliphatic hydrocarbon residue having or not having ring structure; Y represents a halogen atom or alkyl group; y ranges from zero to a whole number of replaceable hydrogens substituted on the aliphatic hydrocarbon radical.

One class of the cyclic or noncyclic aliphatic dicarboxylic acid and its reactive derivative (II–2) represented by the General Formula 2–2 are acid halides of cyclic aliphatic dicarboxylic acids or alicyclic dicarboxylic acids (II–2–1) represented by the following General Formula 2–2–1:

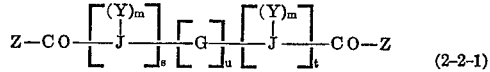
(2-2-1)

wherein Z is a chlorine atom or bromine atom; J is an alicyclic hydrocarbon radical; G is a member selected from the group consisting of divalent groups —D—, —E—, —D—E— and —D—E—D— (wherein D is a divalent aliphatic hydrocarbon radical of up to six carbon atoms, and E is —O—, —S—, —SO₂—, —CO— or —O—CO—O—); Y represents a halogen atom or alkyl group; m ranges from zero to a whole number of replaceable hydrogens substituted on the alicyclic hydrocarbon radical; s and t range from zero to one, however, s+t range from one to 2; u ranges from zero to one, however when s+t is one u must be zero.

One class of acid dihalides of alicyclic dicarboxylic acids (II–2–1) having the Formula 2–2–1 are acid dihalides of mononuclear alicyclic dicarboxylic acid having the following Formula 2–2–1–1:

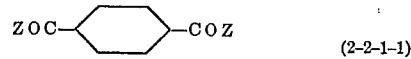
(2-2-1-1)

wherein

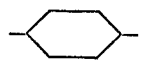

is a cyclohexylene group, preferably trans-cyclohexylene group, Z is a chlorine atom or bromine atom.

Mononuclear alicyclic dicarboxylic acids corresponding to acid dihalides having the Formula 2–2–1–1 are represented by the formula

and a preferable example of the mononuclear alicyclic dicarboxylic acids is trans-hexahydroterephthalic acid.

Other examples of mononuclear alicyclic dicarboxylic acids include, for example, hexahydroisophthalic acid, hexahydrophthalic acid and the like.

Another class of acid dihalides of alicyclic dicarboxylic acids (II–2–1) having the Formula 2–2–1 are acid dihalides of dinuclear alicyclic dicarboxylic acids (II–2–1–2) having the following Formula 2–2–1–2:

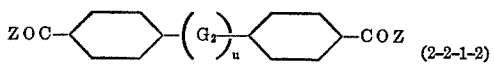 (2-2-1-2)

wherein

is a cyclohexylene group, preferably trans-cyclohexylene group; $G_2$ is —O—, —CH$_2$—, —CH$_2$CH$_2$—,

—SO$_2$—, —Si(CH$_3$)$_2$— or

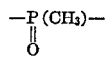

$u$ ranges from zero to one; Z is a chlorine atom or bromine atom.

Preferable examples of acid dihalides of dinuclear alicyclic dicarboxylic acids (II–2–1–2) include, for example, trans-trans-4,4'-dodecahydrodibenzoyl chloride (which may be used as a mixture with cis-trans-4,4'-dodecahydrodibenzoyl chloride and/or cis-cis-4,4'-dodecahydrodibenzoyl chloride).

Other examples of acid dihalides of dinuclear alicyclic dicarboxylic acid (II–2–1–2) include, for example 3,3'-dodecahydrodibenzoyl chloride and 2,2'-dodecahydrodibenzoyl chloride.

Dinuclear alicyclic dicarboxylic acids, corresponding to acid dihalides of dinuclear alicyclic dicarboxylic acid (II–2–1–2) having the General Formula 2–2–1–2, are represented by the following formula:

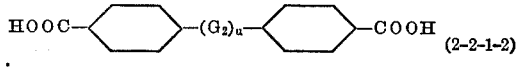 (2-2-1-2)

wherein

is a cyclohexylene group; $G_2$ is —O—, —CH$_2$—,

—C(CH$_3$)$_2$—, —SO$_2$—, —Si(CH$_3$)$_2$— or

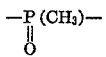

$u$ ranges from zero to one.

Preferable examples of the dinuclear alicyclic dicarboxylic acids include, for example, trans-trans-4,4'-dodecahydrodibenzoic acid (which may be used as a mixture with cis-trans-4,4'-dodecahydrodibenzoic acid and/or cis-cis-4,4'-dodecahydrodibenzoic acid).

Other examples of the dinuclear alicyclic dicarboxylic acids include, for example, 3,3'-dodecahydrodibenzoic acid and 2,2'-dodecahydrodibenzoic acid.

Examples of other acid dihalides of alicyclic dicarboxylic acids (II–2–1) having the Formula 2–2–1, include acid dihalides of alicyclic dicarboxylic acids having three member ring, four member ring or five member ring, such as trans-cyclopropane-1,2-dicarbonyl chloride,
trans-3-methyl-cyclopropane-1,2-dicarbonyl chloride,
trans-cyclobutane-1,3-dicarbonyl chloride,
cyclopentane-1,3-dicarbonyl chloride,
cis-cyclopropane-1,2-dicarbonyl chloride,
cyclopentane-1,2-dicarbonyl chloride and the like.

Examples of alicyclic dicarboxylic acids, corresponding to acid dihalides of alicyclic dicarboxylic acids having three member ring, four member ring or five member ring, include, for example, trans-cyclopropane-1,2-dicarboxylic acid,
trans-3-methyl-cyclopropane-1,2-dicarboxylic acid,
trans-cyclobutane-1,3-dicarboxylic acid,
cyclopentane-1,3-dicarboxylic acid,
cis-cyclopropane-1,2-dicarboxylic acid,
cyclobutane-1,2-dicarboxylic acid,
cyclopentane-1,2-dicarboxylic acid and the like.

Another class of dicarboxylic acid or its reactive derivatives (II–2) having the General Formula 2–2 are acid dihalides of dicarboxylic acids (II–2–2) represented by the following General Formula 2–2–2:

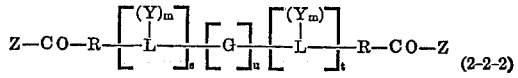 (2-2-2)

wherein Z is a chlorine atom or bromine atom; L is an aromatic hydrocarbon radical or an alicyclic hydrocarbon radical; G is a member selected from the group consisting of divalent groups —D—, —E—, —D—E— and —D—E—D— (wherein D is a divalent aliphatic hydrocarbon radical of up to six carbon atoms; and E is —O—, —S—, —SO$_2$—, —CO— or —O—CO—O—); R is a divalent aliphatic hydrocarbon radical attached directly to ring carbon of L; $m$ ranges from zero to a whole number of replaceable hydrogens substituted on the aromatic or alicyclic hydrocarbon radical; Y represents a halogen atom or alkyl group; $s$ and $t$ range from zero to one, however $s+t$ range from one to 2; $u$ ranges from zero to one, however when $s+t$ is one $u$ must be zero.

One class of acid dihalides of dicarboxylic acids (II–2–2) having the Formula 2–2–2 are acid dihalides of dicarboxylic acids having the following General Formula 2–2–2–1:

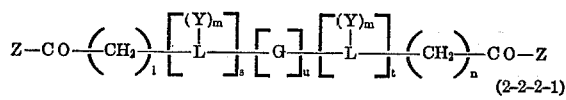 (2-2-2-1)

wherein Z, L, Y, G, $m$, $s$, $t$ and $u$ have the same significance defined heretofore; $l$ and $n$ range from one to 3.

Preferable examples of acid dihalides of dicarboxylic acids having the Formula 2–2–2–1 are acid dihalides of dicarboxylic acids having a six member ring represented by the following General Formula 2–2–2–1–1:

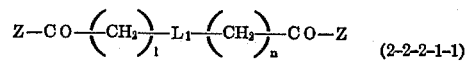 (2-2-2-1-1)

wherein $L_1$ is a para-phenylene group or para-cyclohexylene group; Z is a chlorine atom or bromine atom; $l$ and $n$ range from one to 3.

Examples of acid dihalides of dicarboxylic acids having a six member ring represented by the Formula 2–2–2–1–1, include, for example, p-phenylene diacetyl chloride and p-phenylene dipropionyl chloride, p-hexahydrophenylene diacetyl chloride, the acid dibromides corresponding to them and the like.

Dicarboxylic acids, corresponding to acid dihalides of dicarboxylic acids having a six-member ring represented by the Formula 2-2-2-1-1, are represented by the formula:

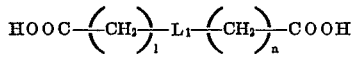

wherein $L_1$ is a para-phenylene group or a para-cyclohexylene group; $l$ and $n$ range from one to 3, and preferable examples of the dicarboxylic acids include, for example, p-phenylene diacetic acid, p-phenylene dipropionic acid, p-hexahydrophenylene diacetic acid and the like.

Another class of acid dihalides of dicarboxylic acids having the Formula 2-2-2-1 are acid dihalides of dicarboxylic acids having two six-member rings represented by the following General Formula 2-2-2-1-2:

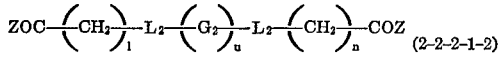 (2-2-2-1-2)

wherein $L_2$ is a member selected from the group consisting of p-phenylene group, m-phenylene group, 1,4-cyclohexylene group and 1,3-cyclohexylene group; Z is a chlorine atom or bromine atom; $G_2$ is —O—, —CH$_2$— or —CH$_2$CH$_2$—; $l$ and $n$ range from one to 3; $u$ ranges from zero to one.

Examples of the acid dihalides of dicarboxylic acids having two six-member rings represented by the Formula 2-2-2-1-1 include, for example, the following:.

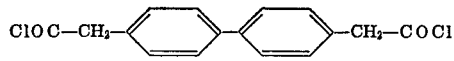
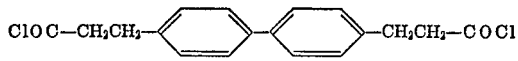
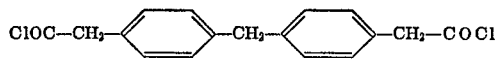
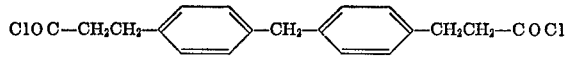
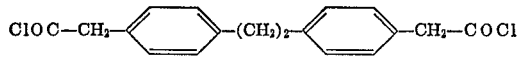
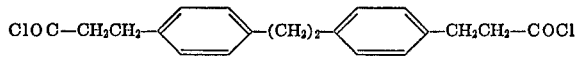
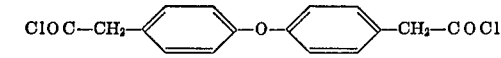
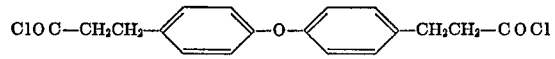

Dicarboxylic acids, corresponding to acid dihalides of dicarboxylic acids having two six-member rings represented by the Formula 2-2-2-1-2, are represented by the formula:

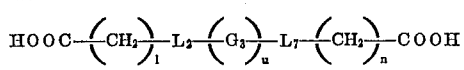

wherein $L_2$ is a member selected from theg roup consisting of p-phenylene group, m-phenylene group, 1,4-cyclohexylene group and 1,3-cyclohexylene group; $G_3$ is —O—, —CH$_2$— or —CH$_2$CH$_2$—; $l$ and $n$ range from one to 3; $u$ ranges from zero to one, and preferable examples of the dicarboxylic acids include, for example,

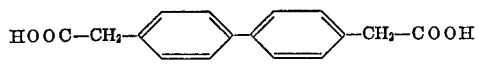
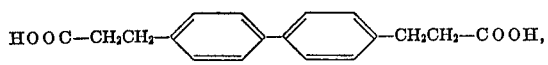
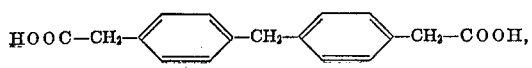
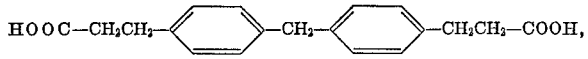
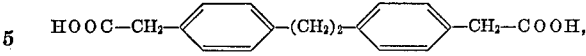
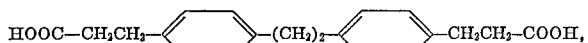
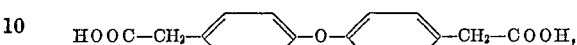

Other examples of dicarboxylic acids and acid dihalides of dicarboxylic acid represented by the General Formula 2-2 include, for example, noncyclic aliphatic dicarboxylic acids such as malonic acid, succinic acid, glutaric acid, adipic acid, pimelic acid, suberic acid, azelaic acid and sebacic acid, and acid dihalides corresponding to them.

Preferable dicarboxylic acid or its dihalide is an aromatic dicarboxylic acid or its dihalide, especially isophthalic acid and isophthaloyl dichloride.

If desired, other dihydric phenol or its diacetate, in addition to octahalobiphenol or its reactive derivative represented by the General Formula 1, can be used for preparing the polyester of this invention.

Illustrative other dihydric phenols include dihydric polynuclear phenols having the following General Formula 3;

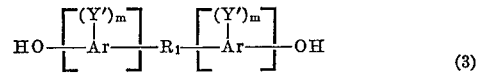 (3)

wherein: Ar is an aromatic divalent hydrocarbon group or radical such as naphthylene and phenylene, with phenylene being preferred for purposes of this invention: Y', which can be the same or different, is alkyl group such as methyl, n-propyl, n-butyl, n-hexyl, n-octyl and the like, preferably alkyl group having a maximum of 4 carbon atoms, or halogen atoms, i.e., chlorine, bromine, iodine, or fluorine, or alkoxy groups such as methoxy, methoxymethyl, ethoxy, ethoxyethyl, n-butoxy, amyloxy and the like, preferably an alkoxy groups having a maximum of 4 carbon atoms (it is to be understood that whenever there are substituents exclusive of the hydroxyl groups on either or both of the aromatic divalent hydrocarbon groups, that these substituents can be the same or different); $m$ is an integer having a value of from 0 to a maximum value corresponding to the number of hydrogen atoms on the aromatic ring (Ar) which can be replaced by substituents and can have the same or different values; and $R_1$ is a divalent group or radical, as for example

or —O—, or —S—, or —SO—, or —SO$_2$—, or a divalent hydrocarbon group as, for example, an alkylene group such as methylene, ethylene, trimethylene, tetramethylene, pentamethylene, hexamethylene, 2-ethyl hexamethylene, octamethylene, nonamethylene, decamethylene, and the like, an alkylidene group such as ethylidene, propylidene, isopropylidene, isobutylidene, amylidene isoamylidene, 1-phenyl ethylidene and the like, or a cycloaliphatic group, such as 1,4-cyclohxylene, 1,3-cyclohexylene, cyclohexylidene and the like, or halogenated alkylidene, alkylene or cycloaliphatic groups, alkoxy and aryloxy substituted alkylidene, alkylene or cycloaliphatic groups, such as methoxy methylene, ethoxy methylene, ethoxy ethylene, 2-ethoxy-trimethylene, 3-ethoxy pentamethylene, 1,4-(2-methoxycyclohexane), phenoxy ethylene, 2-phenoxy trimethylene, 1,3-(2-phenoxy cyclohexane), and the like, aralkylene groups, such as phenyl ethylene, 2-phenyl trimethylene, 1-phenyl pentamethylene, 2-phenyl decamethylene, and the like, aromatic groups, such as phenylene, naphthylene, and the like, halogenated aromatic groups, such as 1,4-(2-chlorophenylene), 1,4-(2-bromophenylene), 1,4-(2-fluorophenylene), and the like; alkoxy and aryloxy substituted aromatic groups, such as 1,4-(2-methoxyphenylene), 1,4-(2-ethoxyphenylene), 1,4-(2-n-propoxyphenylene), 1,4-(2-phenoxyphenylene), and the like, alkyl substituted aromatic groups, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like, or $R_1$ can be a ring which is fused to one of the Ar groups as is the case, for example, in the compound having the formula:

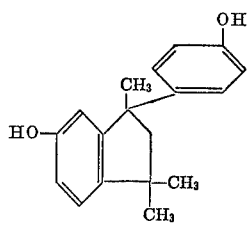

or $R_1$ can be a polyalkoxy group such as polyethoxy, polypropoxy polythioethoxy, polybutoxy, polyphenylethoxy, or $R_1$ can be a group containing a silicon atom as, for example, polydimethylsiloxy, polydiphenylsiloxy, polymethylphenylsiloxy and the like, or $R_1$ can be two or more alkylene or alkylidene groups separated by an aromatic ring, a tertiary amino group, an ether linkage, a carbonyl group or separated by a linkage containing sulfur such as sulfur, sulfoxide and the like.

Particularly preferred as the dihydric polynuclear phenols are compounds having the general formula:

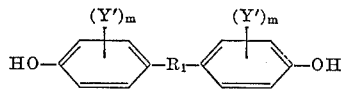

wherein Y' is as previously defined, m has values of from 0 to 4 inclusive and $R_1$ is an alkylene or alkylidene group, preferably having from 1 to 3 carbon atoms inclusive or $R_1$ is a phenylene group having the formula:

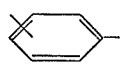

or $R_1$ is a saturated group having the formula:

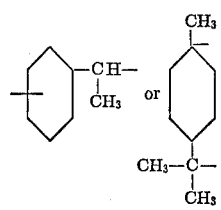

Exemplary of specific dihydric phenols include among others the bis(hydroxyphenyl)-alkanes such as 2,2-bis-(p-hydroxyphenyl)-propane, commonly referred to as bisphenol-A, 2,4'-dihydroxy diphenylmethane,
bis-(2-hydroxyphenyl)-methane,
bis-(4-hydroxyphenyl)-methane,
bis-(4-hydroxy-2,6-dimethyl-3-methoxyphenyl)-methane,
1,1-bis-(4-hydroxyphenyl)-ethane,
1,2-bis-(4-hydroxyphenyl)-ethane,
1,1-bis-(4-hydroxy-2-chlorophenyl)-ethane,
1,1-bis-(3,5-dimethyl-4-hydroxyphenyl)-ethane,
1,3-bis-(3-methyl-4-hydroxyphenyl)-propane,
2,2-bis-(3-phenyl-4-hydroxyphenyl)-propane,
2,2-bis-(3-isopropyl-4-hydroxyphenyl)-propane,
2,2-bis-(2-isopropyl-4-hydroxyphenyl)-propane,
2,2-bis-(4-hydroxynaphthyl)-propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenylmethane,
bis-(4-hydroxyphenyl)-cyclohexylmethane,
1,2-bis-(4-hydroxyphenyl)-1,2-bis-(phenyl)-propane,
2,2-bis-(4-hydroxyphenyl)-1-phenylpropane and the like; dihydroxyphenyls such as 4,4'-dihydroxybiphenyl,
2,2'-dihydroxybiphenyl,
2,4-dihydroxybiphenyl and the like; di(hydroxyphenyl)-sulfones such as bis-(4-hydroxyphenyl)-sulfone,
2,4'-dihydroxydiphenyl sulfone,
5'-chloro-2,4'-di-hydroxydiphenyl sulfone,
5'-chloro-4,4'-dihydroxydiphenyl sulfone,
3'-chloro-4,4'-dihydroxy diphenyl sulfone and the like; di(hydroxyphenyl)ethers such as bis-(4-hydroxyphenyl)-ether,
the 4,3'-, 4,2'-, 2,2'-, 2,3'-dihydroxy-diphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxybiphenyl)-ether,
4,4'-dihydroxy-2,6-dimethoxydiphenyl ether,
4,4'-dihydroxy-2,5-diethoxydiphenyl ether, and the like; also suitable are 1,1-bis-(4-hydroxyphenyl)-2-phenylethane,
1,3,3'-trimethyl-1-(4-hydroxyphenyl)-6-hydroxyindane,
2,4-bis-(p-hydroxyphenyl)-4-methylpentane and the like.

Other examples of other dihydric phenols are dihydric mononuclear phenols such as resorcinol, hydroquinone, pyrocatechine, tetrachlorohydroquinone, and 1,5- (or 2,7- or 2,6-) dihydroxynaphthalene.

Above mentioned other dihydric phenols can be used as a mixture of two or more phenols.

Polyester having inflammability, thermal stability and chemical resistance in response to the various uses can be prepared by using the other dihydric phenol or its diacetate in addition to octahalobiphenol or its reactive derivative.

Further, dihydric alycyclic alcohol, dihydric aliphatic alcohol or diacetates thereof may be added, as required, to octahalobiphenol or its reactive derivative.

One of preferable examples of the polyesters of this invention is the polyester comprising essentially recurring structural units having following Formula 4-1:

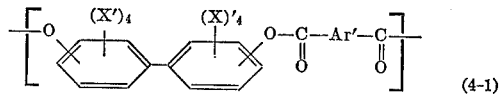

wherein X' represents a member selected from the group comprising chlorine atom and bromine atom; Ar' is a divalent aromatic nucleus such as phenylene, naphthylene, bis-phenylene.

More preferable examples of the polyester having the General Formula 4-1 are the polyesters comprising essentially recurring structural units having following Formula 4-1-1:

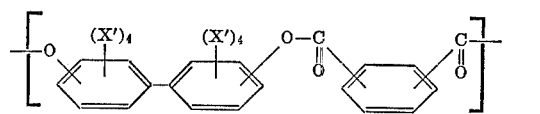

wherein X' represents a member selected from the group comprising chlorine atom and bromine atom.

Another more preferable examples of the polyester having the General Formula 4–1 are the polyesters consisting essentially of recurring structural units having the following Formula 4–1–2

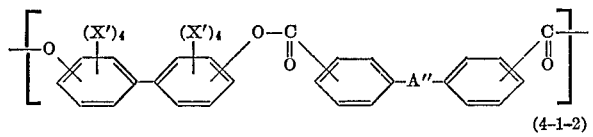

(4-1-2)

wherein X' represents a member selected from the group comprising chlorine atom and bromine atom; A'' is a divalent aliphatic hydrocarbon radical.

One of the preferable examples of the polyesters of this invention are the polyesters comprising essentially recurring structural units having following Formula 4–2:

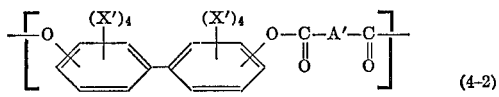

(4-2)

wherein X' represents a member selected from the group comprising chlorine atom and bromine atom; A' is a divalent aliphatic radical having or not having ring structure (for example, aromatic ring, alicyclic ring, heterocyclic ring).

More preferable examples of the polyester having the General Formula 4–2 are the polyesters consisting essentially of recurring structural units having the following Formula 4–2–1:

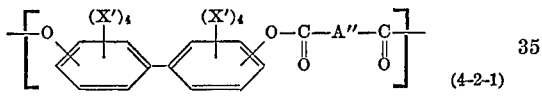

(4-2-1)

wherein X' represents a member selected from the group comprising chlorine atom and bromine atom; A'' is divalent aliphatic hydrocarbon radical having no ring structure.

The polyester of the present invention can be obtained by the reaction of octahalobiphenol or a mixture of octahalobiphenol and other dihydric phenol with dicarboxylic acit or its derivative by interfacial, solution or melt polycondensation.

In the case of the interfacial polycondensation, the polyester was obtained by the reaction of two or more moles of alkali metal hydroxide, alkaline earth metal hydroxide, alkali metal carbonate or alkaline earth metal carbonate, preferably, between about 2 and 2.1 moles of alkali metal hydroxide or alkaline earth metal hydroxide or between about 2 and 2.5 moles of alkali metal carbonate or alkaline earth metal carbonate, with 1.0 mole of octahalobiphenol or a mixture of octahalobiphenol and other dihydric phenol. Alkali metal hydroxide, alkaline earth metal hydroxide and their carbonates usable according to this invention are known in the art, such as sodium hydroxide, potassium hydroxide, calcium hydroxide, lithium hydroxide, sodium carbonate, potassium carbonate, calcium carbonate, and etc.

In this reaction, octahalobiphenol or mixtures of octahalobiphenol and other dihydric phenol, a catalyst and an anion surface-active agent (for example, sodium lauryl sulfate etc.) are added to the aqueous solution of alkali metal hydroxide, alkaline earth metal hydroxide or their carbonates.

The catalyst is one or more compounds chosen from quarternary ammonium compounds, tertiary sulfonium compounds and quaternary sulfonium compounds, and the catalyst is appropriate to use in an amount of 0.001 wt. percent to 5 wt. percent.

The catalyst can also be added with the acid dihalide, and the acid dihalide compound is dissolved in an inert organic solvent.

The reaction is carried out by using 1.0 mole of dihydric phenol and 1.0 mole to 1.05 moles of the acid dihalide compound. Examples of the inert organic solvent include, chloroform, 1,2-dichloroethane, methylene chloride, 1,1,2-trichloroethane, tetrachloroethylene, 1,1,2,2-tetrachloroethane, 1,1,1,2-tetrachloroethane, trichloroethylene, tetrachloromethane and the like.

The inert organic solvent is appropriate to be used in an amount of more than 10 wt. percent based on the aqueous alkali solution. This acid dihalide solution can be added at one time or slowly in portions to the mixture of dihydric phenol, the aqueous alkali solution and the catalyst at a temperature between −10° C. and the boiling point of the inert organic solvent.

The solid contents in the reaction mixture may vary widely, but high solid contents will make the mixture so viscous that it will be difficult to be after-treated.

After the reaction, this mixture is washed with water, and removed the solvent from and poured into an antisolvent. A coarsely divided product is obtained.

In this polycondensation, the polyester is preferably obtained by the reaction of 1.0 mole of the divalent phenol, 0.05 wt. percent to 3.5 wt. percent of the catalyst, 1.0 mole to 1.01 moles of the acid dihalide and 2.0 moles to 2.01 moles of the alkali hydroxide or 2.0 moles to 2.3 moles of the alkali carbonate at a temperature of −5° C. to 45° C.

The inert organic solvent is appropriate to be used in an amount of more than 50 wt. percent based on the aqueous alkali solution.

Examples of the quaternary ammonium salts to be used as catalyst are those of the following formula:

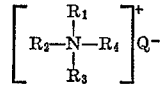

wherein $R_1$, $R_2$ and $R_3$ are organic radicals such as alkyl, hydroxylalkyl, aryl, alkaryl, or aralkyl having up to 8 carbon atoms, and each of $R_1$, $R_2$ and $R_3$ may be the same or different, however $R_1$ and $R_2$ may be joined with a carbon-carbon bond, $R_4$ is an alkyl group having 4 or less than 4 carbon atoms, and $Q^-$ is a monovalent anion.

Examples of $R_1$, $R_2$ and $R_3$ are alkyl groups such as methyl, ethyl, n-butyl, n-pentyl or cyclohexyl etc., and hydroxyalkyl groups such as hydroxyethyl etc., and aryl groups such as phenyl etc., and alkaryl groups such as tolyl etc., and aralkyl groups such as benzyl etc. Preferably, all organic radicals $R_1$, $R_2$ and $R_3$ are alkyls or two organic radicals among $R_1$, $R_2$ and $R_3$ are alkyls, these alkyl groups having 4 or less than 4 carbon atoms.

In the case where $R_1$ and $R_2$ are joined together to form a cyclic chain, for example,

is a piperidine ring, etc. and $R_3$ is preferably an alkyl group having 4 or less than 4 carbon atoms.

Examples of $R_4$ are alkyl groups such as methyl, ethyl, n-propyl, n-butyl etc. and, as the examples of $Q^-$, there may be mentioned halogen ions (for example, chlorine, bromine and iodine), alkyl sulfate ion (for example, methyl sulfate and ethyl sulfate ions), aromatic sulfonate ions (for example, p-toluene sulfonate and benzene sulfonate ions) and hydroxyl ion.

Halogen, methyl sulfate and hydroxyl ions are preferable.

As examples of particularly preferable quarternary ammonium salts, there may be mentioned for example, tetramethyl ammonium chloride, tetramethyl ammonium bromide, tetramethyl ammonium iodide, tetramethyl ammonium hydroxide, tetramethyl ammonium methyl sulfate, trimethylbenzyl ammonium chloride, trimethylbenzyl ammonium hydroxide, N-dimethyl-piperidium chloride, triethylbenzyl ammonium chloride, triethylbenzyl ammonium bromide, trimethylbenzyl ammonium bromide, triethylbenzyl ammonium iodide, trimethylbenzyl ammonium iodide, triethylbenzyl ammonium hydroxide, trimethyl-α (or β) naphthobenzyl ammonium chloride, trimethyl-α (or β) naphthobenzyl ammonium bromide, trimethyl-α (or β) naphthobenzyl ammonium iodide, triethyl-α (or β) naphthobenzyl ammonium chloride, etc.

Other compounds to be used as catalysts are tertiary sulfonium compounds and tetraphosphonium compounds.

As examples of tertiary sulfonium compounds and tetraphosphonium compounds, there may be mentioned, for example, S,S' - p - xylene-bis(dihydroxyethylsulfonium bromide), S,S'-1,6-hexamethylene-bis(dimethylsulfonium bromide), tribenzylsulfonium hydrodiphenyl sulfate, triphenylmethyl phosphonium iodide, triphenylbenzyl phosphonium chloride, p-xylene - bis - (triphenylphosphonium chloride), p - xylene - bis(triethylphosphonium bromide), tetraethyl phosphonium bromide, triethyloctadecilphosphonium iodide, etc.

In the case of solution polycondensation, the polyester is obtained by the reaction of octahalobiphenol or a mixture of octahalobiphenol and other dihydric phenol with an acid dihalide in the presence of a catalyst and an inert organic solvent.

The inert organic solvent is required to dissolve the produced polymer. For example, chloroform, methylene chloride, 1,2 - dichloroethane, 1,1,2 - trichloroethane, 1,1,2,2 - tetrachloroethane, tetrachloroethylene, trichloroethylene, N,N - dimethylsulfoxide, N,N - diethylsulfoxide, N,N - diethylsulfone, N - methyl-2-pyrroldone, N,N-dimethylformamide, N,N-dimethylacetoamide, etc. can be used.

In this case, the catalyst is a base which neutralizes hydrogen chloride formed. For example, a tertiary amine, etc. can be used.

The polyester is obtained by the reaction of 1.0 mole of octahalobiphenol or a mixture of octahalobiphenol and other dihydric phenol, 2.0 moles to 2.5 moles of an acid acceptor and 1.0 mole to 1.05 moles of the acid dihalide in the inert organic solvent at a temperature of 20° C. to 150° C. or the boiling point of the organic solvent. The solid contents in the solution of the inert organic solvent should be less than 50%. In this case, a tertiary amine may replace the inert organic solvent.

In this solution polycondensation, the polyester is obtained preferably by employing 1.0 mole of dihydric phenol, 1.0 mole to 1.005 moles of the acid dihalide, and 2.0 moles to 2.2 moles of the catalyst (for example, tertiary amine) at 50° C. to 120° C. In this case, the inert organic solvent should be preferably used in an amount which will make the solid contents in the solution to be in the range of 10% to 35% by weight.

The tertiary amine catalysts are compounds of the formula,

wherein $R_5$, $R_6$ and $R_7$ are organic radicals such as alkyl, hydroxyalkyl, aryl, aralkyl and alkaryl groups, and each of $R_5$, $R_6$ and $R_7$ may be the same or different, however $R_5$, $R_6$ and $R_7$ may be joined together with a nitrogen atom, and $R_5$ and $R_6$ may be joined together by a carbon-carbon bond or joined together as a cyclic chain interrupted by oxygen atom or tertiary nitrogen atoms.

Examples of $R_5$, $R_6$ and $R_7$ are alkyl groups such as methyl, ethyl, n-propyl, n-butyl, n-heptyl, cyclopentyl, cyclohexyl, etc., hydroxylalkyl groups such as hydroxyethyl, hydroxyisopropyl, etc., aryl groups such as phenyl, etc., alalkyl groups such as benzyl, α-methyl benzyl, etc. and alkaryl group such as tolyl, etc.

As particularly preferable combinations of $R_5$, $R_6$ and $R_7$, there may be mentioned the cases where all organic radicals of $R_5$, $R_6$ and $R_7$ are alkyl or hydroxylalkyl groups, and two organic radicals of $R_5$, $R_6$, and $R_7$ are alkyl groups, and the other radical is aryl, alalkyl or alkaryl group. In this case, the alkyl or hydroxyalkyl group radical is the one having 4 or less than 4 carbon atoms.

When $R_5$, $R_6$ and $R_7$ are joined together with nitrogen atom, the above formula will be represented as

wherein R is an alkylene group having 4 or less than 4 carbon atoms.

When $R_5$ and $R_6$ are joined with a cyclic bond,

will be, for example, a piperidine radical, etc. and when $R_5$ and $R_6$ are joined together with oxygen,

will be, for example, a morpholine, radical, etc. Further, when $R_5$ and $R_6$ are joined together with a tertiary nitrogen atom,

will be, for example, N-alkyl-piperidine radical, etc. In these cases, $R_7$ is an alkyl group having 4 or less than 4 carbon atoms.

As particularly preferable tertiary amines, there may be mentioned, for example, trialkyl amines such as trimethyl amine, triethylamine, tri-n-propylamine; dialkylamine pyridines such as benzyl methyl amine, trihydroxyalkyl amines such as triethanol amine, N,N-dimethyl (or ethyl) aniline.

$R_5$ and $R_6$ may be joined together with a nitrogen bond, as in the case of, for example, triethylene diamine. Also, $R_5$ and $R_6$ may be joined together as a cyclic chain, as in the case of, for example, N-methyl piperidine. Further, $R_5$ and $R_6$ may be joined together with oxygen atom, as in the case of, for example, N-methyl morpholine.

In another case of solution polycondensation, the polyester is obtained by reacting 1.0 mole of octahalobiphenol or a mixture of octahalobiphenol and dihydric phenol, 1.0 mole to 1.01 moles of the acid dihalide in an inert organic solvent. The inert organic solvent should have a boiling point of more than 140° C.

For example, nitrobenzene, anisol, orthodichlorobenzene and orthocresol can be used. The inert oragnic solvent should be employed in an amount to make the solid contents in the solution to be between 20% and 45% by weight. The mixture is heated to the reaction temperature in a nitrogen atmosphere during the period of more than one hour, and the reaction is continued further for more than one hour. After reaction, the solvent is removed under a reduced pressure and the residue is poured into an antisolvent. Thus, a coarsely divided product is obtained. In this solution polycondensation, the polyester is obtained preferably by employing 1.0 mole of octahalobiphenol or a mixture of octahalobiphenol and the dihydric phenol, 1.0 mole to 1.001 moles of the acid dihalide in the inert organic solvent. The solvent should be used in such an amount that will make the solid content in the solution to be between 30% and 35% by weight. The reaction is carried out at a temperature from 140° C. to the decomposition temperature of the acid dihalide for a period of more than 3 hours.

In the case of melt polycondensation, the polyester is obtained by reacting 1.0 mole of octahalobiphenol diacetate or a mixture of octahalobiphenol diacetate and dihydric phenol diacetate and 1.0 mole to 1.1 moles of dicarboxylic acid in the presence of a catalyst. The reaction mixture is heated in a stream of nitrogen to the reaction temperature during the period of more than 0.5 hour. The reaction temperature is between the melting point of the monomer and the decomposition point of monomer and the pressure is reduced to a pressure below 60 mm. Hg to remove most of the acetic acid produced. Then, the mixture is heated further to a temperature more than the softening temperature of the polymer, and the pressure is reduced to below 5 mm. Hg. During this period, the remainder of the acetic acid is removed. In carrying out the reaction, the use of a metal or a metal compound as catalyst is very effective for obtaining a high molecular weight polyester. As examples of such metals and metal compounds, there may be mentioned titanium dioxide, magnesium oxide, antimony trioxide, butyl orthotitanate and magnesium metal.

As other catalysts, para-toluene sulfonic acid and the like are also effective. After the reaction, the solid polymer is collected and washed with an anti-solvent. In this polycondensation the polyester is obtained preferably by employing 1.0 mole of octahalobiphenol diacetate or a mixture of octahalobiphenol diacetate and other dihydric phenol diacetate, and 1.0 mole to 1.001 moles of the dicarboxylic acid.

The mixture is heated to its melting state during the period of more than one hour and the pressure is then reduced to 40–50 mm. Hg at which pressure a further heating is continued for 1 to 2 hours. Then, the catalyst is added in an amount of 0.005 mole to 0.04 mole per 1.0 mole of octahalobiphenol or its mixture with dihydric phenol. After the addition, the reaction mixture is heated to 220–300° C., the pressure is reduced to below 1 mm. Hg, and the reaction is carried out for 2 to 4 hours.

Details of the preparation of specific resins according to the invention are presented in the following examples. All "parts" are by weight. Reduced viscosities (R.V.) of the obtained polymer are determined in accordance with the following equation by using Ostwald viscosimeter or other type viscosimeter;

$$R.V. = \frac{ts - to}{Cto}$$

$ts$=efflux time of the polymer solution; $to$=efflux time of the solvent. The concentration (C) is grams of the polymer per 100 ml. of the solvent. The measurement is made at a temperature of 30° C. by using 10 ml. of a solution of 0.2 gram of the polymer in 100 ml. of chloroform or 1,1,2,2-tetrachloroethane. The mechanical properties are measured with respect to 0.22 mm. thickness films of the produced polymers. The mechanical properties of the film are measured by the following methods.

| | |
|---|---|
| Tenile strength | ASTM D-882-64T |
| Tensile modulus of elasticity | ASTM D-882-64T |
| Elongation | ASTM D-882-64T |
| Oxygen index | ASTM D-2368-70 |

Oxygen index is calculated by the following equation:

$$\text{Oxygen index } n = (\text{percent}) \frac{[O_2] - 100}{[O_2] + [N_2]}$$

wherein $[O_2]$ is the minimum volumetric concentration of oxygen in the mixture of oxygen and nitrogen for supporting the combustion of the material and $[N_2]$ is the corresponding nitrogen concentration.

Glass transition temperature.—Measured by the method described in Alexander Broun, Textile Research J., 25, 891 (1955).

Decomposition temperature.—Measured by thermogravimetric analysis (heating rate: 205° C./min. in air).

EXAMPLES OF INTERFACIAL POLYCONDENSATION

Example 1

Solution A.—A pulverized mixture of 11.5451 parts of 4,4'-octachlorobiphenol, 0.2 part of trimethylbenzyl ammonium chloride and 0.3 part of sodium lauryl sulfate was dissolved into a solution of 2.8054 parts of potassium hydroxide and 100 parts of water.

Solution B.—5.1165 parts of isophthaloyl chloride was dissolved into 70 parts of chloroform.

The solution B was added dropwise to the solution A at 15° C. over a period of 10 min. with stirring. The reaction was continued at 15° C. for one hour, and it was heated at 40° C. for 0.5 hour. The mixture was washed with water, distilled to remove 50 parts of chloroform and poured into 150 parts of methanol.

The polyester was filtered and dried at 100° C. for 20 hours.

Polymer yield: 14.8 parts (100%).

R.V.: 0.86 (in 1,1,2,2-tetrachloroethane).

Film properties:

| | |
|---|---|
| Tensile strength (kg./cm.$^2$) | 684 |
| Tensile modulus of elasticity (kg./cm.$^2$) | $1.57 \times 10^4$ |
| Elongation (percent) | 5.3 |
| Oxygen index (O$_2$ percent) | 83.0 |
| Glass transition temperature (° C.) | 250 |
| Decomposition temperature (° C.) | 475 |

Example 2

Solution A.—It was prepared by the same procedure as in Example 1.

Solution B.—A mixture of 8.0699 parts of isophthaloyl chloride and 2.0466 parts of terephthaloyl chloride was added into 70 parts of 1,1,2,2-tetrachloroethane.

The solution B was added dropwise to the solution A at 20° C. over a period of 30 min. with stirring. The reaction was continued at 20° C. for 2 hours, and it was heated at 45° C. for one hour.

The polyester polymer was obtained by the same procedure as in Example 1.

Polymer yield: 14.7 parts (99.3%).

R.V.: 0.82 (in 1,1,2,2-tetrachloroethane).

Film properties:

| | |
|---|---|
| Tensile strength (kg./cm.$^2$) | 690 |
| Tensile modulus of elasticity (kg./cm.$^2$) | $1.85 \times 10^4$ |
| Elongation (percent) | 4.5 |
| Oxygen index (O$_2$ percent) | 84.5 |
| Glass transition temperature (° C.) | 256 |
| Decomposition temperature (° C.) | 420 |

Example 3

Solution A.—A pulverized mixture of 5.7725 parts of 4,4'-octachlorobiphenol, 2.8537 parts of 2,2-bis(4-hydroxyphenyl)propane, 0.2 part of triethylbenzylammonium chloride and 0.3 part of sodium lauryl sulfate was added into 2.8054 parts of potassium hydroxide and 100 parts of water.

The solution B.—It was prepared by the same procedure as in Example 1. The solution B was added dropwise to the solution A at 10° C. over a period of 20 min. with stirring. The reaction was continued at 10° C. for one hour.

The polymer was obtained by the same procedure as in Example 1.

Polymer yield: 11.7 parts (98.3%).

R.V.: 0.76 (in 1,1,2,2-tetrachloroethane).

Film properties:

Tensile strength (kg./cm.$^2$) _____ 685
    Tensile modulus of elasticity
      (kg./cm.$^2$) _____ 1.46×10$^4$
    Elongation (percent) _____ 5.5
    Glass transition temperature (° C.) _____ 243
    Decomposition temperature (° C.) _____ 390
    Oxygen index (O$_2$ percent) _____ 46.0

Example 4

Solution B.—A mixture of 0.8952 part of isophthaloyl chloride and 2.0888 parts of terephthaloyl chloride were added into 60 parts of chloroform.

The solution A was prepared by the same procedure as in Example 1. The solution B was added dropwise to the solution A at 25° C. over a period of 40 min. with stirring. The reaction was continued at 40° C. for 1.5 hours, and it was heated at 40° C. for one hour.

The polymer was obtained by the same procedure as in Example 1.

Polymer yield: 14.8 parts (100%).

R.V.: 0.8 (in a mixture of 40 parts of 1,1,2,2-tetrachloroethane and 60 parts of phenol).

Film properties:

Tensile strength (kg./cm.$^2$) _____ 697
    Tensile modulus of elasticity (kg./cm.$^2$)__ 1.98×10$^4$
    Elongation (percent) _____ 0.4
    Oxygen index (O$_2$ percent) _____ 86.0
    Glass transition temperature (° C.) ____ 260
    Decomposition temperature (° C.) _____ 420

Example 5

Solution B.—8.0946 parts of 4,4-diphenylpropane-2,2-dicarboxylic chloride were added into 80 parts of 1,1,2,2-tetrachloroethane.

The solution A was prepared by the same procedure as in Example 1. The solution B was added dropwise to the solution A at 10° C. over a period of 30 min. with stirring. The reaction was continued at 10° C. for one hour, and it was heated at 35° C. for one hour.

The polymer was obtained by the same procedure as in Example 1.

Polymer yield: 17.6 parts (99.2%).

R.V.: 0.92 (in 1,1,2,2-tetrachloroethane).

Film properties:

Tensile strength (kg./cm.$^2$) _____ 700
    Tensile modulus of elasticity (kg./cm.$^2$)__ 1.51×10$^4$
    Elongation (percent) _____ 5.5
    Oxygen index (O$_2$ percent) _____ 65.0
    Glass transition temperature (° C.) ____ 270
    Decomposition temperature (° C.) _____ 450

Example 6

Solution A.—A mixture of 20.4355 parts of 4,4-octabromobiphenol, 0.2 part of trimethylbenzylammonium chloride and 0.3 part of sodium lauryl sulfate was added into 2.8054 parts of potassium hydroxide and 120 parts of water.

Solution B.—5.1165 parts of isophthaloyl chloride were added into 100 parts of chloroform.

The polymer was obtained by the same procedure as in Example 1.

Polymer yield: 23.7 parts (100%).

R.V.: 0.8 (in 1,1,2,2-tetrachloroethane).

Film properties:

Tensile strength (kg./cm.$^2$) _____ 680
    Tensile modulus of elasticity (kg./cm.$^2$)__ 1.50×10$^4$
    Elongation (percent) _____ 4.0
    Oxygen index (O$_2$ percent) _____ 92.0
    Glass transition temperature (° C.) ____ 265

These polyester products prepared in Examples 1 to 6 show higher glass transition temperatures and more flame retardant than various polymers shown below.

Ind. Chem. Eng., 51, 147 (1957), British Pat. 636,429.—Polyester having the structure of:

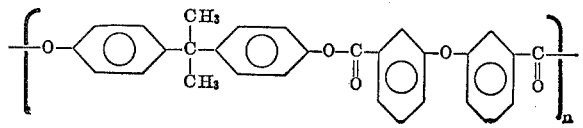

Tensile strength (kg./cm.$^2$) _____ 600
    Tensile modulus of elasticity (kg./cm.$^2$) _____ 1.65×10$^4$
    Elongation (percent) _____ 7.0
    Glass transition temperature (° C.) _____ 200
    Oxygen index (O$_2$ percent) _____ <25

Japanese patent publication No. 427,799.—Polyester having the structure of:

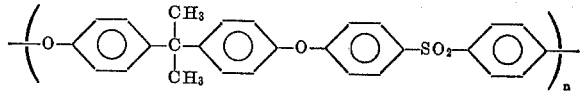

Tensile strength (kg./cm.$^2$) _____ 648–700
    Tensile modulus of elasticity (kg./cm.$^2$) _____ 1.60×10$^4$
    Elongation (percent) _____ 7.0
    Glass transition temperature (° C.) _____ 200
    Oxygen index (O$_2$ percent) _____ 29.5

The following shows the flame retardant properties of known polymers.

| | | Oxygen index (O$_2$ Percent) |
|---|---|---|
| Polycarbonate | Lexane DL-444 | 39.5 |
| | Lexane NB-155 | 43.5 |
| Polyester |  | <25 |
| |  | <25 |

As shown above, the polyester according to the invention is more flame retardant than the corresponding polyesters and also known flame retardant polycarbonates.

Example 7

Solution A.—A mixture of 11.5451 parts of 4,4'-octachlorobiphenol, 0.2 part of trimethylbenzyl ammonium chloride and 0.3 part of sodium lauryl sulfate was added into 5.4 parts of sodium carbonate and 100 parts of water.

Solution B.—4.6127 parts of adipyl chloride was added into 50 parts of chloroform.

The solution B was added to the solution A at 17° C. over a period of 30 min. with stirring. The reaction was continued at 5° C. for 1.5 hours, and it was heated at 45° C. for 1.5 hours.

The polymer was obtained by the same procedure as in Example 1.

Polymer yield: 14.3 parts (100%).

R.V.: 1.1 (in 1,1,2,2-tetrachloroethane).

Film properties:
- Tensile strength (kg./cm.²) _____ 157
- Tensile modulus of elasticity (kg./cm.²) _ 7.77×10³
- Elongation (percent) _____ 5.0
- Oxygen index (O₂ percent) _____ 63.0
- Glass transition temperature (° C.) _____ 100
- Decomposition temperature (° C.) ____ 355

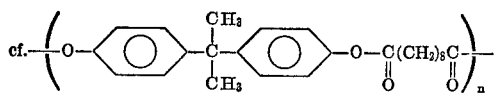

- Oxygen index (O₂ percent) _____ <25
- Glass transition temperature (° C.) ____ 21.5

The polyester product prepared in Example 7 had a higher glass transition temperature and was more flame retardant than the corresponding polyesters prepared from bisphenol A.

These polyesters according to the present invention prepared here had higher stability hydrolysis by alkali and acid, and lower dielectric constants.

EXAMPLES OF SOLUTION POLYCONDENSATION

Example 8

Solution A.—A mixture of 11.5451 parts of 4,4'-octachlorobiphenol and 7.4630 parts of diethyl aniline was placed into 60 parts of 1,1,2,2-tetrachloroethane.

Solution B.—8.0303 parts of 4,4'-diphenylpropane-2,2 dicarboxylic chloride were placed into 50 parts of 1,1,2,2-tetrachloroethane.

The solution B was added dropwise to the solution A heated to 70° C. over a period of 30 min. with stirring. After heating was continued at a temperature of 95° C. to 100° C., the pressure was reduced to below 40 mm. Hg., and distilled to remove 70 parts of 1,1,2,2-tetrachloroethane. The mixture was poured into 200 parts of methanol, and collected by filtration.

Polymer yield: 17.7 parts (99.7%).
R.V.: 0.74 (in 1,1,2,2-tetrachloroethane).

Example 9

Solution A.—A mixture of 11.5451 parts of 4,4'-octachlorobiphenol and 5.0600 parts of triethylamine was placed into 60 parts of N,N-dimethylacetoamide.

Solution B.—4.5761 parts of adipyl chloride were placed into 40 parts of N,N-dimethylacetoamide.

The solution B was added dropwise to the solution A at 70° C. over a period of 20 min. with stirring. The reaction was continued at 70° C. for 4.0 hours.

The polymer was obtained by the same procedure as in Example 8.

Polymer yield: 14.3 parts (100%).
R.V.: 0.68 (in 1,1,2,2-tetrachloroethane).

Example 10

A mixture of 11.5451 parts of 4,4'-octachlorobiphenol and 5.0759 parts of isophthaloyl chloride was placed into 100 parts of dimethylaniline. The reaction was continued at 100° C. for 5.0 hours.

The polymer was obtained by the same procedure as in Example 8.

Polymer yield: 14.8 parts (100%).
R.V.: 0.70 (in 1,1,2,2-tetrachloroethane).

Example 11

In a reactor equipped with a gas inlet tube reaching to the bottom of the reactor, there were placed 11.5451 parts of 4,4'-octachlorobiphenol, 4.5761 parts of adipyl chloride and 50 parts of nitrobenzene. The mixture was stirred with nitrogen gas stream, and heated at 145° C. for 2.5 hours. After the heating was continued at 145° C. for 5.0 hours, the pressure was reduced to below 40 mm. Hg, and distilled to remove nitrobenzene. The mixture was reheated at 145° C. for additional one hour.

The polymer was washed with water and methanol.
Polymer yield: 14.2 parts (99.8%).
R.V.: 0.66 (in 1,1,2,2-tetrachloroethane).

EXAMPLES OF MELT POLYCONDENSATION

Example 12

A pulverized mixture of 11.5451 parts of 4,4'-octachlorobiphenol diacetate and 3.65365 parts of adipic acid was charged into a reactor. It was heated in a stream of nitrogen at 195° C. for 1.5 hours. After the mixture formed a melt, the pressure was reduced to 50 mm. Hg for 0.5 hour, and distilled to remove acetic acid produced. The mixture was heated at 195° C. for one hour under 50 mm. Hg to remove most of the acetic acid produced. Then, 0.2 part of titanium dioxide was added to the reaction mixture. The mixture was reheated at 270° C. for one hour, and the pressure was reduced to a vacuum below 1 mm. Hg for one hour. After the mixture was kept for additional 5 hours under these conditions, the polymer was obtained.

The polymer was washed with methanol.
Polymer yield: 14.1 parts (98.6%).
R.V.: 0.95 (in 1,1,2,2-tetrachloroethane).

Example 13

A mixture of 14.0237 parts of 4,4'-octachlorobiphenol diacetate, 5.1534 parts of isophthalic acid and 0.15 part of titanium dioxide was placed by the same procedure as Example 12. The mixture was heated at 230° C. for one hour under 40 mm. Hg, and distilled to remove acetic acid produced. Then, the mixture was heated at 300° C. for additional 3 hours under vacuum below 1 mm. Hg.

Polymer yield: 14.6 parts (98.6%).
R.V.: 1.1 (in 1,1,2,2-tetrachloroethane).

Example 14

A mixture of 14.0237 parts of 4,4'-octachlorobiphenol diacetate, 7.1079 parts of 4,4'-diphenylpropane - 2,2 - dicarboxylic acid and 0.2 part of titanium dioxide was placed into the reactor by the same procedure as in Example 12. The mixture was heated at 220° C. for one hour under 35 mm. Hg, and distilled to remove acetic acid produced. Then, the mixture was heated at 300° C. for additional 5 hours under vacuum of below 1 mm. Hg.

Polymer yield: 17.6 parts (99.2%).
R.V.: 0.97 (in 1,1,2,2-tetrachloroethane).

Example 15

In a reactor flushed with nitrogen, there were placed 13.6470 parts of 4,4'-octachlorobiphenol diacetate and 5.0564 parts of sebatinic acid. The mixture was heated in a stream of nitrogen at 200° C. for 1.5 hours. After the mixture formed a melt, the pressure was reduced to 30 mm. Hg, and distilled to remove acetic acid produced. The mixture was kept for one hour under these conditions, and distilled to remove most of acetic acid produced. Then, 0.2 part of titanium dioxide was added to the reaction mixture, and heated at 250° C. for one hour under vacuum below 1 mm. Hg. The mixture was kept for additional 3 hours under these conditions.

Polymer yield: 15.6 parts (99.3%).
R.V.: 1.2 (in 1,1,2,2-tetrachloroethane).

All the polyester products prepared here had higher glass transition temperatures and were more flame retardant than corresponding conventional polyesters. These polyesters were equivalent rather to aromatic polyethers with respect to mechanical properties. Further, these polyesters had higher flame retardant properties than conventional aromatic polyethers and polyesters.

What we claim is:
1. A linear, film-forming polyester consisting essentially of recurring structural units of the formula:

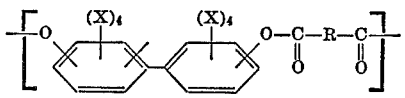

wherein X is halogen; and R is a member selected from the group consisting of divalent aliphatic radicals and divalent aromatic radicals.

2. A method for preparing a linear, film-forming polyester consisting essentially of recurring structural units of the formula

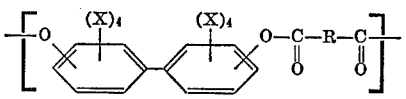

wherein X is halogen; and R is a member selected from the group consisting of divalent aliphatic radicals and divalent aromatic radicals, which comprises mixing
   (a) an aqueous solution containing 1.0 mole of at least one compound of the formula

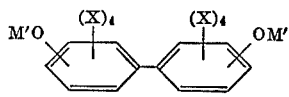

wherein X has the same meaning as above and M' is an alkali metal or alkaline earth metal, and
   (b) an inert organic solvent solution containing from 1.0 to 1.05 moles of at least one compound of the formula:

wherein Z is halogen and R has the same meaning as above,
and effecting an interfacial polycondensation reaction in the presence of interfacial polycondensation catalyst and anionic surface-active agent, at a temperature of from −10° C. up to the boiling point of the inert organic solvent.

3. A method for preparing a linear, film-forming polyester consisting essentially of recurring structural units of the formula

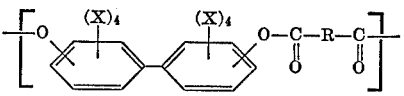

wherein X is halogen; and R is a member selected from the group consisting of divalent aliphatic radicals and divalent aromatic radicals, which comprises mixing with 2.0 to 2.5 moles of tertiary amine,
   (a) an inert organic solvent solution containing 1.0 mole of at least one compound of the formula:

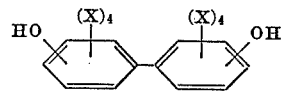

wherein X has the same meaning as above, and
   (b) an inert organic solvent solution containing 1.0 to 1.05 moles of a compound of the formula

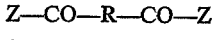

wherein Z is halogen and R has the same meaning as above,
and effecting a solution polycondensation reaction at a temperature of from 20° C. to 150° C.

4. A method for preparing a linear, film-forming polyester consisting essentially of recurring structural units of the formula

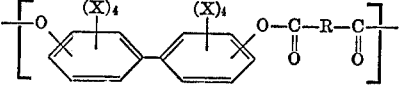

wherein X is halogen; and R is a member selected from the group consisting of divalent aliphatic radicals and divalent aromatic radicals, which comprises mixing
   (a) 1.0 mole of at least one compound of the formula:

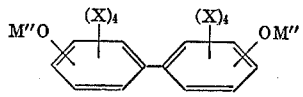

wherein X has the same meaning as above and M″ is an acyl group having 2 to 4 carbon atoms, and
   (b) 1.0 to 1.1 moles of at least one compound of the formula:

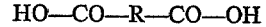

wherein R has the same meaning as defined above, melting the mixture and effecting a polycondensation reaction in the molten state, under reduced pressure to remove the acid produced by the reaction.

5. A linear, film-forming polyester consisting essentially of recurring structural units of the formula:

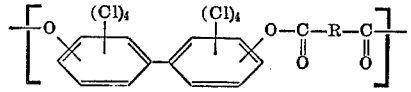

wherein R is a member selected from the group consisting of divalent aliphatic radicals and divalent aromatic radicals.

6. A method for preparing a linear, film-forming polyester consisting essentially of recurring structural units of the formula

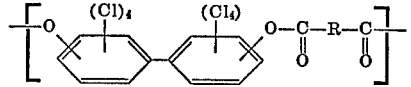

wherein R is a member selected from the group consisting of divalent aliphatic radicals and divalent aromatic radicals, which comprises mixing
   (a) an aqueous solution containing 1.0 mole of at least one compound of the formula

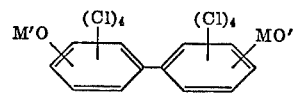

wherein M′ represents an alkali metal metal or alkaline earth metal, and
   (b) an inert organic solvent solution containing from 1.0 to 1.05 moles of at least one compound of the formula:

wherein Z is halogen and R has the same meaning as above,
and effecting an interfacial polycondensation reaction in the presence of interfacial polycondensation catalyst and anionic surface-active agent, at a temperature of from −10° C. up to the boiling point of the inert organic solvent.

7. A method for preparing a linear, film-forming polyester consisting essentially of recurring structural units of the formula

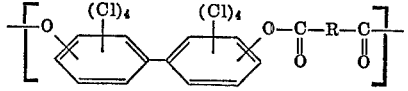

wherein R is a member selected from the group consisting of divalent aliphatic radicals and divalent aromatic radicals, which comprises mixing with 2.0 to 2.5 moles of tertiary amine,
   (a) an inert organic solvent solution containing 1.0 mole of at least one compound of the formula:

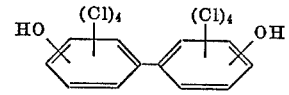

(b) an inert organic solvent solution containing 1.0 to 1.05 moles of a compound of the formula $$Z—CO—R—CO—Z$$

wherein Z is halogen and R has the same meaning as above,
and effecting a solution polycondensation reaction at a temperature of from 20° C. to 150° C.

8. A method for preparing a linear, film-forming polyester consisting essentially of recurring structural units of the formula

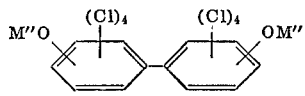

wherein R is a member selected from the group consisting of divalent aliphatic radicals and divalent aromatic radicals, which comprises mixing (a) 1.0 mole of at least one compound of the formula:

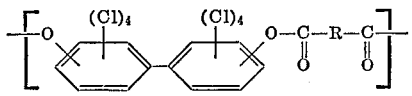

wherein M″ is an acyl group having 2 to 4 carbon atoms, and (b) 1.0 to 1.1 moles of at least one compound of the formula:

$$HO—CO—R—CO—OH$$

wherein R has the same meaning as defined above, melting the mixture and effecting a polycondensation reaction in the molten state, under reduced pressure to remove the acid produced by the reaction.

References Cited

UNITED STATES PATENTS

| | | | |
|---|---|---|---|
| 3,234,167 | 2/1966 | Sweeny | 260—30.4 |
| 3,498,950 | 3/1970 | Shatz et al. | 260—47 |
| 3,505,289 | 4/1970 | Conix et al. | 260—49 |
| 3,704,279 | 11/1972 | Ismail | 260—61 |

LESTER L. LEE, Primary Examiner

U.S. Cl. X.R.

260—30.2, 30.8 R, 30.8 DS, 32.6 N, 33.8 R, 49, 61 Dig. 24

UNITED STATES PATENT OFFICE
CERTIFICATE OF CORRECTION

Patent No. 3 786 022    Dated January 15, 1974

Inventor(s) Naoaki Hata and Yuzo Takase

It is certified that error appears in the above-identified patent and that said Letters Patent are hereby corrected as shown below:

Col. 22, line 31; correct the formula to read:

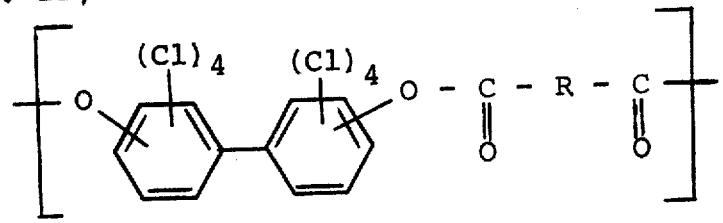

Col. 22, line 42; correct the formula to read:

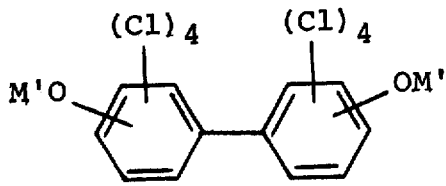

Col. 22, line 45; change "metal metal" to ---metal---.

Signed and sealed this 14th day of May 1974.

(SEAL)
Attest:

EDWARD M. FLETCHER, JR.
Attesting Officer

C. MARSHALL DANN
Commissioner of Patents